(12) United States Patent
Robinson et al.

(10) Patent No.: US 11,475,554 B2
(45) Date of Patent: Oct. 18, 2022

(54) FINISHED PALLET INSPECTION APPARATUS

(71) Applicant: Ball Corporation, Broomfield, CO (US)

(72) Inventors: David C. Robinson, Arvada, CO (US); John Siles, Westminster, CO (US)

(73) Assignee: BALL COPORATION, Westminster, CO (US)

( * ) Notice: Subject to any disclaimer, the term of this patent is extended or adjusted under 35 U.S.C. 154(b) by 222 days.

(21) Appl. No.: 16/642,451

(22) PCT Filed: Aug. 31, 2018

(86) PCT No.: PCT/US2018/049127
§ 371 (c)(1),
(2) Date: Feb. 27, 2020

(87) PCT Pub. No.: WO2019/046741
PCT Pub. Date: Mar. 7, 2019

(65) Prior Publication Data
US 2020/0202506 A1 Jun. 25, 2020

Related U.S. Application Data

(60) Provisional application No. 62/553,342, filed on Sep. 1, 2017.

(51) Int. Cl.
*G06T 7/00* (2017.01)
*G01N 21/88* (2006.01)

(52) U.S. Cl.
CPC ......... *G06T 7/001* (2013.01); *G01N 21/8851* (2013.01); *G01N 2021/8893* (2013.01); *G06T 2207/30108* (2013.01)

(58) Field of Classification Search
CPC .......... G01N 21/8851; G01N 21/8806; G01N 2021/8893; G06T 7/001; G06T 2207/30108
See application file for complete search history.

(56) References Cited

U.S. PATENT DOCUMENTS 3,986,611 A * 10/1976 Dreher ............... B65D 71/0096
53/399
5,186,303 A * 2/1993 Seto .................... G05B 19/4015
198/434

(Continued)

FOREIGN PATENT DOCUMENTS

JP 4787246 A1 7/2011
WO WO-2017042747 A2 * 3/2017 ............. G01B 11/00

OTHER PUBLICATIONS

International Search Report; priority document.
Russian Office Action for corresponding Russian Patent Application No. 2020111542 dated Jan. 15, 2021.

*Primary Examiner* — Sang H Nguyen
(74) *Attorney, Agent, or Firm* — Greer, Burns & Crain, Ltd.

(57) ABSTRACT

An image recorder (18) supported above a conveyor (22) captures images of a top surface of the loaded pallet (30) supported on the conveyor (22). The image is transmitted to a computer (26). A software routine stored on a memory on the computer (26) compares the image to a manufacturing specification. The software routine determines whether the image is within a manufacturing tolerance of the manufacturing specification.

14 Claims, 15 Drawing Sheets

(56) References Cited

U.S. PATENT DOCUMENTS

| | | | |
|---|---|---|---|
| 5,249,131 A | 9/1993 | Kato | |
| 6,335,685 B1 * | 1/2002 | Schrott | G06K 19/0723 340/8.1 |
| 2006/0174719 A1 * | 8/2006 | Carter | G01M 5/0075 73/865.9 |
| 2006/0249436 A1 * | 11/2006 | Hardman | B07C 5/34 209/699 |
| 2009/0138121 A1 * | 5/2009 | Wicks | G01B 11/002 700/219 |
| 2009/0188096 A1 * | 7/2009 | Townsend | B23P 19/041 29/239 |
| 2010/0239124 A1 * | 9/2010 | Hazeyama | G06T 7/11 382/103 |
| 2012/0031732 A1 | 2/2012 | Harrington | |
| 2012/0038780 A1 * | 2/2012 | Jeon | G01N 21/95 348/189 |
| 2012/0057022 A1 * | 3/2012 | Nechiporenko | G06V 10/147 348/135 |
| 2013/0156156 A1 * | 6/2013 | Roe | G01N 23/02 378/57 |
| 2015/0203304 A1 * | 7/2015 | Morency | B65G 61/00 414/797 |
| 2016/0355297 A1 | 12/2016 | Hess et al. | |
| 2018/0247404 A1 * | 8/2018 | Goyal | G06T 7/001 |

* cited by examiner

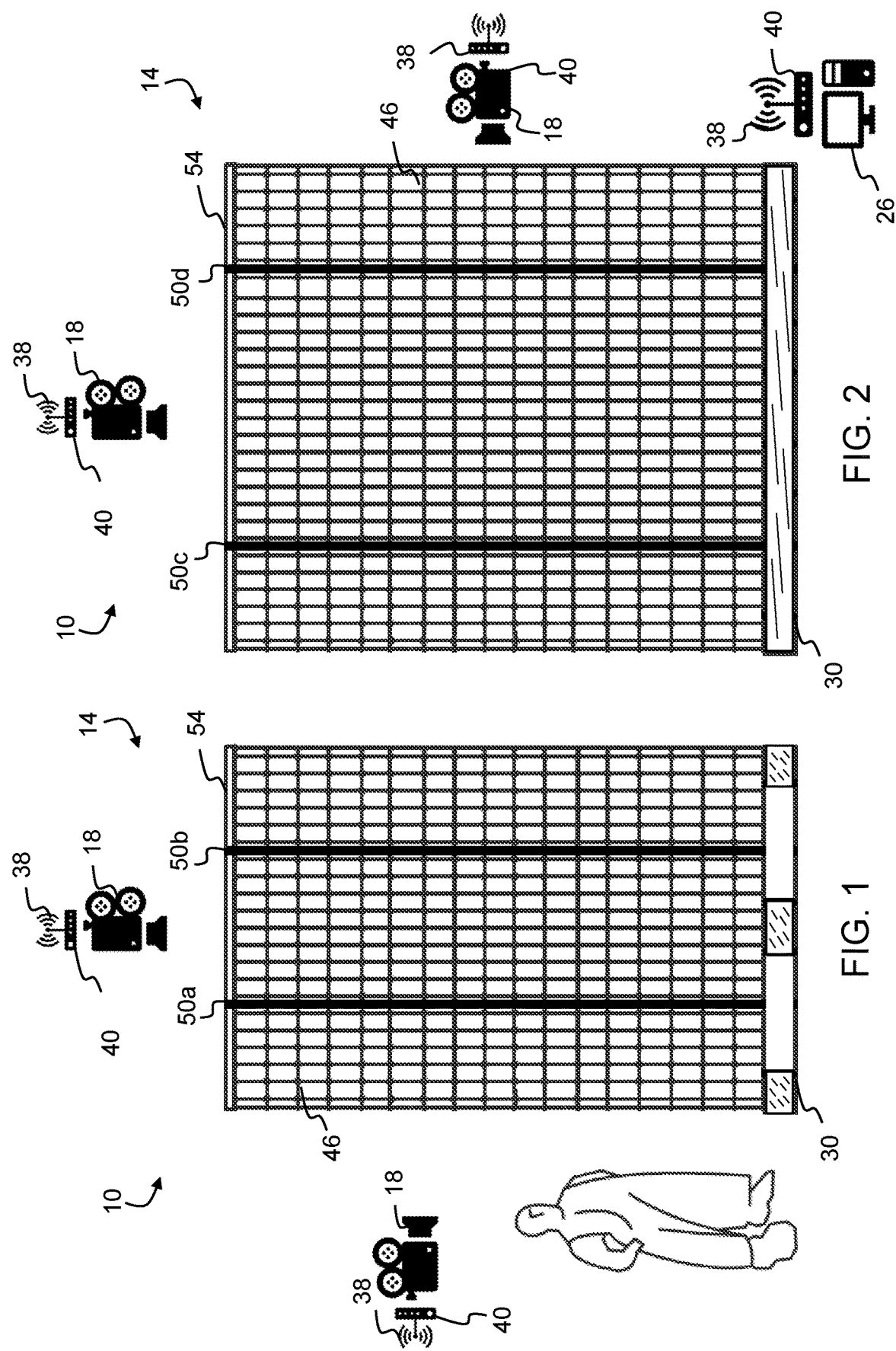

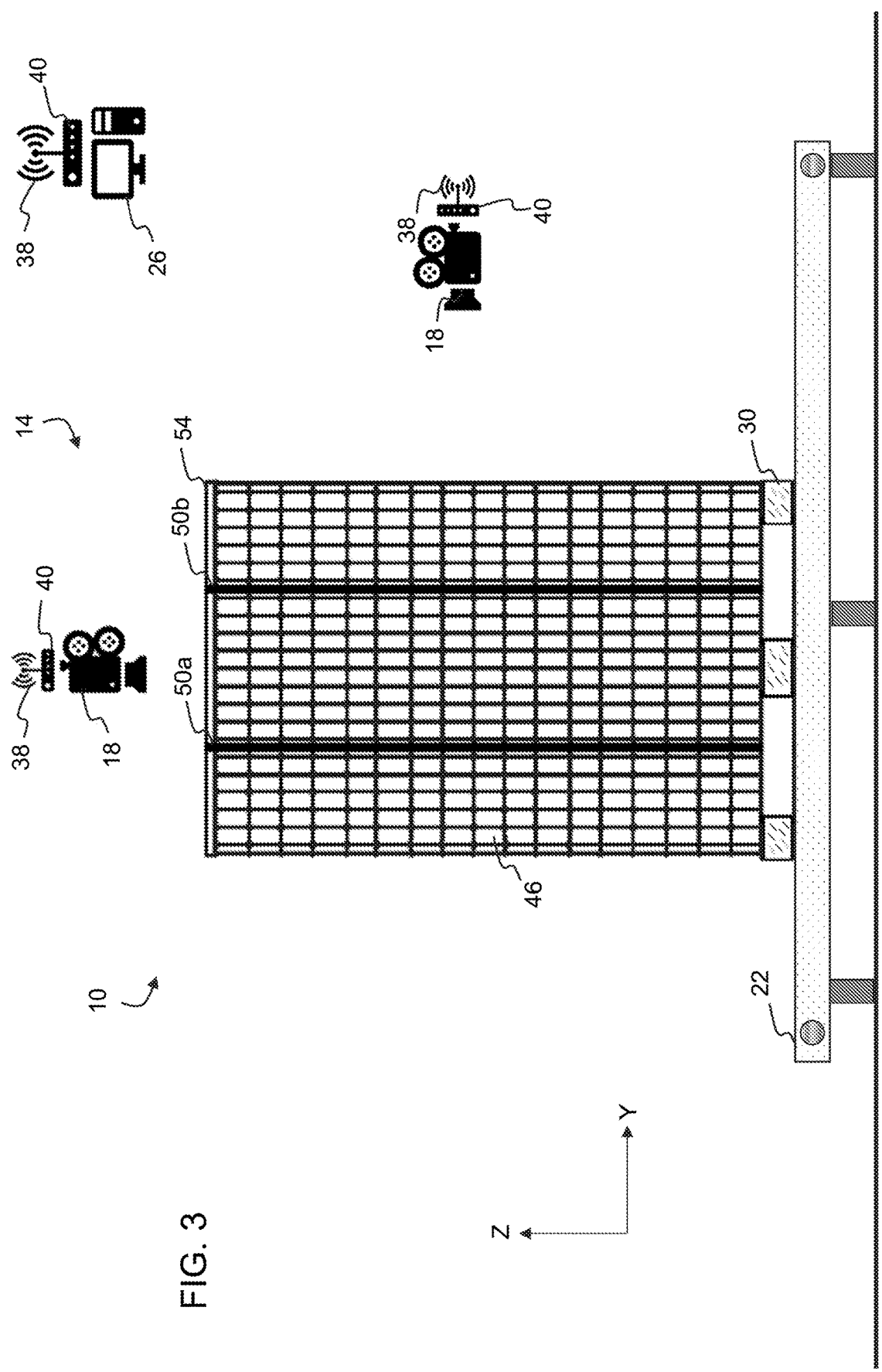

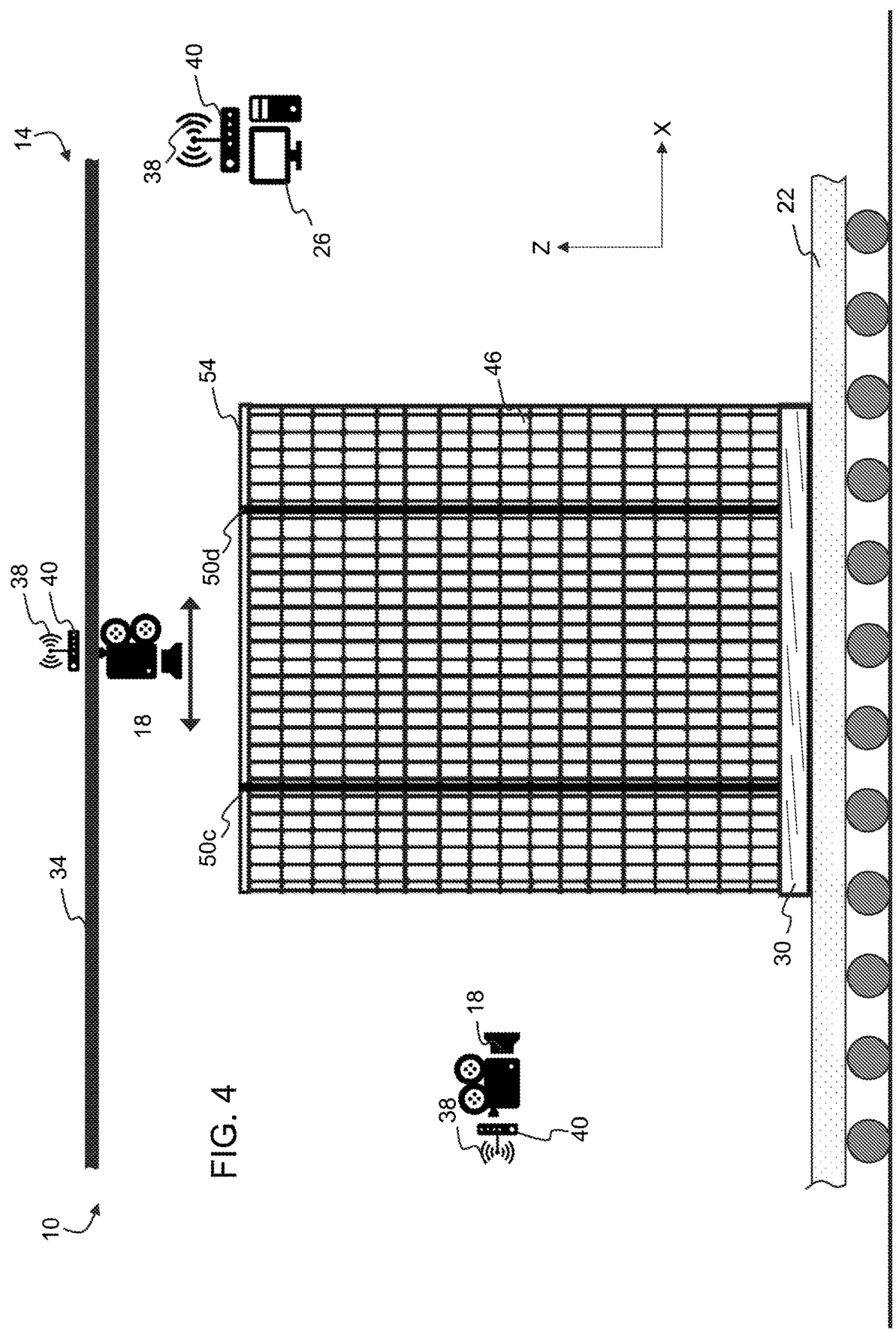

FINISHED PALLET INSPECTION APPARATUS

CROSS-REFERENCE TO RELATED APPLICATIONS

This Application is a United States National Stage Application under 35 U.S.C. Section 371 of International Patent Application No. PCT/US2018/049127 filed on Aug. 31, 2018, which is hereby incorporated by reference as if fully set forth herein. This Application also claims priority to and the benefit of U.S. Provisional Application No. 62/553,342, filed Sep. 1, 2017, which is also hereby incorporated by reference as if fully set forth herein.

FEDERALLY SPONSORED RESEARCH OR DEVELOPMENT

N/A

TECHNICAL FIELD

The invention relates to container handling; more particularly, the invention relates to inspection of loaded and secured container pallets.

BACKGROUND OF THE INVENTION

Production of metallic and non-metallic container bodies generally ends with palletizing thousands of the container bodies on a single pallet for delivery to customers of the container manufacturer. The produced container bodies are stacked in rows and columns on the pallets, where each of the pallets can have about 6,000-15,000 container bodies. A protective layer is placed over the top row of container bodies, and strapping secures the container bodies to the pallet. The resulting pallets are generally quite high due to the large number of container bodies supported thereon.

Filled and sealed metallic and non-metallic containers are similarly palletized. These loaded pallets have an increased value over pallets of empty container bodies due the subsequent processing steps (i.e. filling and seaming lids to open ends of the container bodies) and the fluid products stored within the containers.

Movement of the pallets through the production facility is generally automated. Loaded pallets are moved through the facility on conveyors. The automation requires adherence to general practices and procedures to ensure the pallets are transferred without incident.

SUMMARY OF THE INVENTION

A loaded pallet inspection system comprises: a generally horizontal support surface; an image recorder supported at a height above the support surface; a computer having a memory with a software routine stored thereon; and a communication link between the image recorder and the computer.

A method of inspecting a loaded pallet inspection comprises the steps of: (1) providing an image recorder supported adjacent a conveyor; (2) capturing an image of the loaded pallet supported on the conveyor; (3) transmitting the image to a computer; (4) comparing the image to a manufacturing specification using a software routine stored on a memory on the computer; and (5) determining whether the image is within a manufacturing tolerance of the manufacturing specification using the software routine.

An aspect of the invention is directed to a loaded pallet inspection system comprising: a generally horizontal support surface; an image recorder supported near the support surface; a computer having a memory with a software routine stored thereon; and a communication link transmitting signals between the image recorder and the computer.

This aspect may include one or more of the following features in any reasonable combination. The loaded pallet inspection system may further comprise a target area defined by a boundary having a surface area greater than a cross-sectional surface area of the loaded pallet. The target area may be visibly marked on the support surface. The target area may be defined by crosshairs generated by or on the image recorder. The support surface may be a conveyor for moving loaded pallets. Manufacturing specifications may be stored on the computer memory, and the software routine may compare an image recorded by the image recorder to the manufacturing specification. The manufacturing specification may be directed to an alignment of the loaded pallet on the support surface. The manufacturing specification may be directed to an arrangement of straps securing a plurality of articles to the loaded pallet. The software routine may use a pattern recognition subroutine or a pattern matching logic subroutine to determine whether loaded pallet is within a tolerance of the manufacturing specification. The computer may be in electrical communication with the conveyor to control a movement of the conveyor in response to an output from the software routine. The loaded pallet inspection system may further comprise a first guide mounted above the support surface, wherein the first guide supports the image recorder and is configured to allow longitudinal movement by the image recorder in a direction of a traverse of the conveyor. The loaded pallet inspection system may further comprise a second guide mounted above the support surface, wherein the second guide further supports the image recorder and is configured to allow transverse movement by the image recorder in a direction transverse to the direction of the traverse of the conveyor, wherein the image recorder is multi-positional relative to the support surface. The target area may be transverse to the support surface. The target area may be three dimensional forming a virtual volume.

An aspect of the present invention is directed to a method of inspecting a loaded pallet inspection comprising the steps of: providing an image recorder supported adjacent a conveyor; capturing an image of the loaded pallet supported on the conveyor; transmitting a signal from the image recorder to a computer wherein the signal carries digital information for reproducing the image on the computer; comparing the image to a manufacturing specification using a software routine stored on a memory on the computer; and determining whether the image is within a manufacturing tolerance of the manufacturing specification using the software routine.

This aspect may include one or more of the following features in any reasonable combination. The method may further comprise the step of: moving the image recorder relative to the conveyor in a direction of a traverse of the conveyor. The method may further comprise the step of: moving the image recorder relative to the conveyor in a direction transverse to the traverse of the conveyor. The method may further comprise the step of: automatically stopping movement of the conveyor in response to an output by the software routine by sending a signal from the computer to the conveyor. The image recorder may be supported above the conveyor at height greater than a height of a loaded pallet wherein the capturing an image step includes capturing an image of a top surface of the loaded pallet supported on the conveyor.

Another aspect of the invention is directed to a method of processing manufactured articles comprising the steps: creating a loaded pallet of the manufactured articles; transporting the loaded pallet to an inspection station; aligning the loaded pallet to one or more target areas; examining the loaded pallet; and exiting the loaded pallet from the inspection station.

This aspect may include one or more of the following features in any reasonable combination. The step of examining the loaded pallet may be performed by a combination of one or more image recorders. The step of examining the loaded pallet may include a software stored on a memory of a computer. The step of examining the loaded pallet may include a determination whether the loaded pallet is within a manufacturing tolerance. The manufacturing tolerance may be directed to whether a plurality of articles is adequately secured to a pallet, the determination being be made via a subroutine in the software making a comparison of one or more images of the loaded pallet against a manufacturing standard image of properly secured articles to a pallet. The articles may be secured to the pallet by a retainer. The retainer may be selected from the group consisting of straps, metal bands, and plastic wrap. The manufacturing tolerance may be further directed to whether a loaded pallet is properly aligned relative to an axis transverse to a movement of a conveyor. The determination may be made by a subroutine in the software which determines whether a two-dimensional cross-sectional surface area of the loaded pallet lies with the one or more target areas. The manufacturing tolerance may be further directed to whether a loaded pallet is properly aligned relative to an axis parallel to a movement of a conveyor. The determination may be made by a subroutine in the software which determines whether a two-dimensional cross-sectional surface area of the loaded pallet lies with the one or more target areas. The method may further comprise the step: generating an alarm for an attendant to the loaded pallet being outside of the manufacturing tolerance. The alarm may be generated by a subroutine in the software and may be audible or visual. The attendant may manually determine whether the loaded pallet is fit for use and record whether the loaded pallet is ready for transfer to a next manufacturing process or whether the loaded pallet must be removed from the conveyor. The method may further comprise the step: discharging the loaded pallet to a further manufacturing process automatically after the determination of whether the loaded pallet is within a manufacturing tolerance. The discharging step may be performed by a subroutine in the software. The method may further comprise the step: printing a pallet tag after the determination of whether the loaded pallet is within a manufacturing tolerance. The method may further comprise the step: measuring one or more angles of the loaded pallet relative to one or more reference lines. The one or more reference lines may comprise a vertical line. The one or more reference lines may comprise a horizontal line. The manufacturing tolerance may be directed to one or more angles measured during the measuring step. The method may further comprise the step: storing data related to the measuring step for each loaded pallet in a plurality of pallets.

The loaded pallet of any of the preceding aspects may comprise a plurality of metallic container bodies.

Other features and advantages of the invention will be apparent from the following specification taken in conjunction with the following drawings.

BRIEF DESCRIPTION OF THE DRAWINGS

To understand the present invention, it will now be described by way of example, with reference to the accompanying drawings in which:

FIG. 1 is a side view of a pallet loaded with metallic container bodies and an inspection system according to the present invention;

FIG. 2 is a side view of the pallet loaded and system of FIG. 1 taken at 90 degrees to FIG. 1;

FIG. 3 is a side view of a pallet loaded with metallic container bodies supported on a conveyor and an inspection system according to the present invention;

FIG. 4 is a side view of a pallet loaded with metallic container bodies supported on a conveyor and an inspection system according to the present invention of FIG. 3 taken at 90 degrees to FIG. 3;

DETAILED DESCRIPTION

Figure 5:
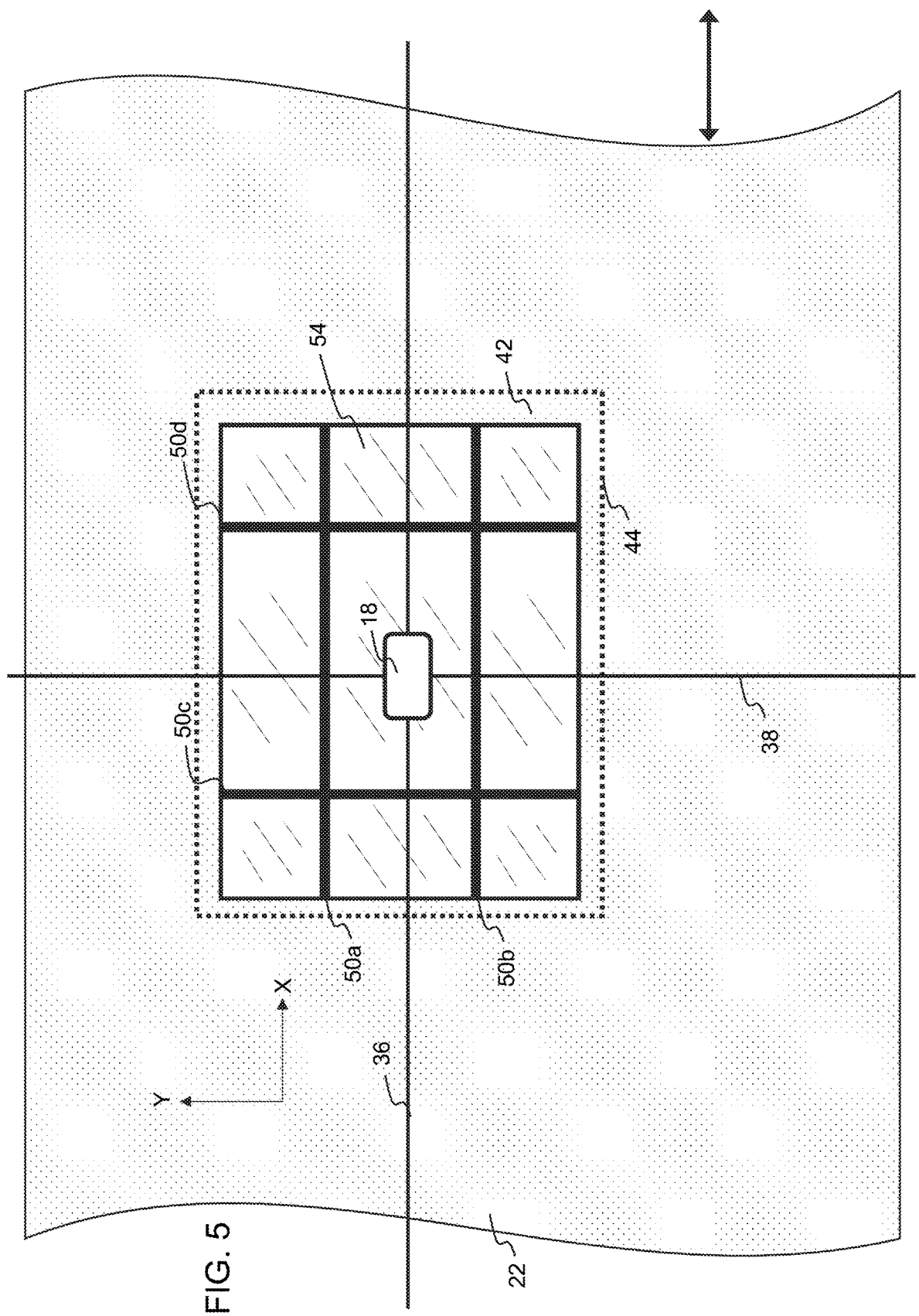
FIG. 5 is a top view of a pallet loaded with metallic container bodies supported on a conveyor with longitudinal and transverse guides for imparting and controlling image recorder movement.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring generally to the figures, the present invention is directed to an inspection apparatus and system. Specifically, the apparatus and system automatically tests/inspects loaded pallets for proper strapping and structure (skewness and plumb). The apparatus and system can also measure magnitude of error and/or take and record angular measurements of the loaded pallets relative to a linear target(s) or reference(s). In a preferred embodiment, the system utilizes digital image processing and pattern recognition in the inspection of loaded pallets.

For purpose of discussion, a loaded pallet includes a plurality of articles stacked on the pallet. These can be any palletized articles, but, for this description, as an illustrative example, the articles are container bodies. The articles may or may not be retained to the pallet by retainers, for example straps, tape, metal bands, plastic or other polymeric wrap, etc.

The term "container bodies" refers to both unfilled and filled containers. One of ordinary skill in the art would readily recognize that unfilled container bodies generally do not have a lid, and the filled container bodies generally have a lid seamed to an open end of the container body to seal a fluid contents within the container. These container bodies can be metallic or non-metallic container bodies.

Referring to FIGS. 1-4, the system includes mounting of an imager, such as a digital camera, above a path of loaded pallets. The imager captures images of the loaded pallets from above. A software stored on the memory of a computer compares them against one or more standards also stored on the memory of the computer. Images of loaded pallets that do not match the standards are highlighted or flagged as non-compliant pending disposition and are temporarily segregated from conforming production inventory.

Thus, simply stated, a compliant pallet will fall within a manufacturing tolerance of a known visual pattern or standard. A defective will not fall within a manufacturing tolerance. The inclusion of or transport of defective pallets could lead to cascading and catastrophic loss of good product.

The present invention utilizes pattern recognition technology to compare an image or images of a full pallet against a standard image or images. One purpose of this system is to assure package integrity and suitability for storage in good product inventory. A goal is to prevent pallets with non-compliant strapping or configuration from being put into inventory. By automating this inspection, costs and variability are reduced. The present technology can be expanded for other purposes or as part of other automated systems such as warehousing.

Still referring to FIGS. 1-4, a system 10 of the present invention includes an inspection station 14 comprising an image recorder 18 located along a production path. The image recorder 18 is preferably a digital image recorder and is in communication with a computer 26. As a loaded pallet 30 is transported in a longitudinal direction on a generally horizontal support surface, typically a conveyor 22, as depicted by the arrows in FIG. 5. It encounters the inspection station 14 where the image recorder 18 collects one or more images of the pallet 30 and the conveyor 22.

In one embodiment, the image recorder 18 of mounted to a fixed surface above an uppermost surface 54 of the loaded pallet 30.

In another embodiment, one or more image recorders 18 are mounted vertically mounted to capture images of sides of the loaded pallets 30 over an entire height of the loaded pallet 30 from the pallet 30 to the uppermost surface 54.

In another embodiment, the image recorder 18 of mounted to a fixed surface above an uppermost surface 54 of the loaded pallet 30. One or more image recorders 18 are mounted vertically mounted to capture images of sides of the loaded pallets 30 over an entire height of the loaded pallet 30 from the pallet 30 to the uppermost surface 54.

Figure 6:
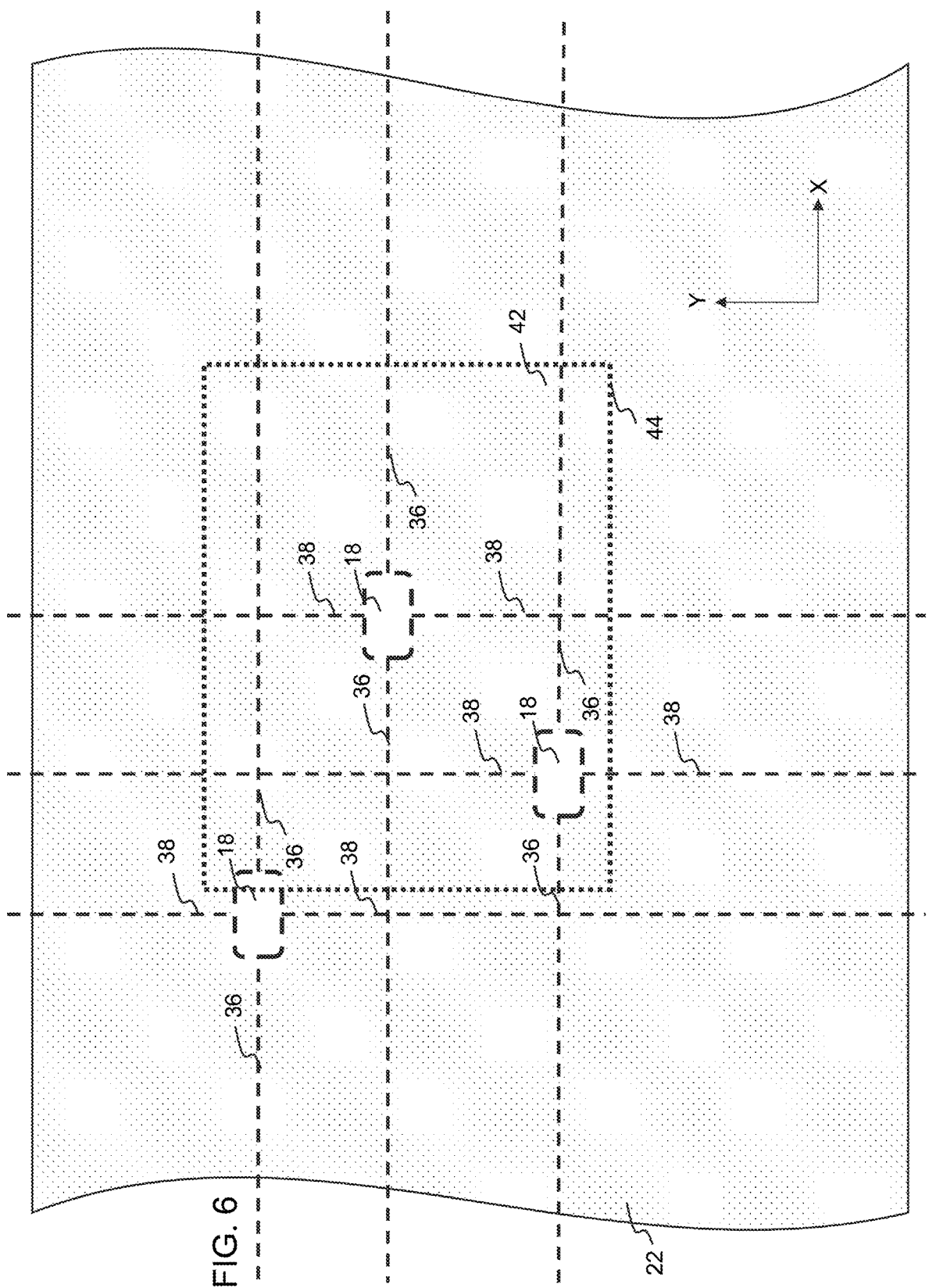
FIG. 6 is a top view of a pallet conveyor having a pallet alignment designator and showing various positions of the image recorder resulting from longitudinal and transverse movement by the image recorder.

In another embodiment of the system 10, the image recorder 18 is attached to a guide 34, such as a rail or cable. This allows the image recorder 18 to traverse longitudinally with the conveyor 22 and pallet 30 movement. In FIG. 6, the longitudinal movement is shown in dashed lines.

In another embodiment of the system 10, the image recorder 18 is attached to a first guide 34 and a second guide 36, such as a rail or cable. This arrangement of the first and second guides 34,36 allows the image recorder 18 to traverse longitudinally with the conveyor 22 and pallet 30 movement and transversely across a width of the conveyor 22.

The first and second guides 34,36 are preferably arranged at 90 degrees to each other to allow unlimited movement transverse and longitudinal movement by the image recorder at the inspections station 14. In FIG. 6, longitudinal and transverse side (along an X-axis and a Y-axis) movements are shown in dashed lines.

Figure 7:
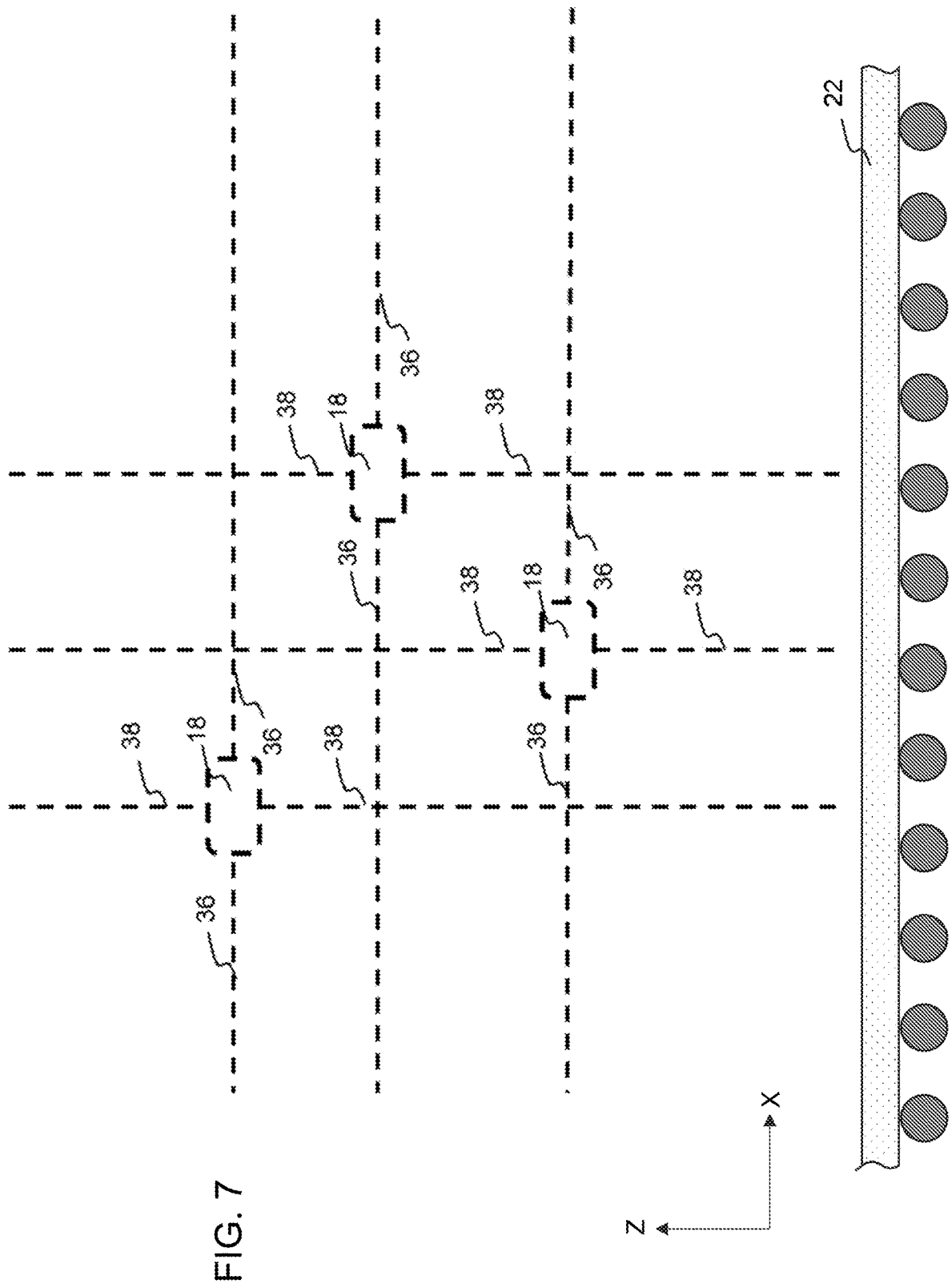
FIG. 7 is a side view of a pallet conveyor having a pallet alignment designator and showing various positions of the image recorder resulting from up-down and side-to-side movement by the image recorder.

One or more image recorders 18 can be vertically mounted as described above using suitable the guides 34,36 for realizing up-down and side-to-side (along a Z-axis and an X-axis or Y-axis) movement by the image recorder 18 as shown in FIG. 7.

The image recorder 18 captures one or more digital images and transmits the images to the computer 26. A signal 38 carrying digital information for reproducing the image on the computer is transmitted via a communication link 40 from the image recorder 18 to the computer, either via wired communication or wirelessly. The image recorder 18 may also be integrated within the computer 26 such that the signal 38 are transmitted within the computer 26 itself. The computer 26 includes a standard memory device on which one or more software routines are stored and executable by a processor on the computer 26. It follows that manufacturing specifications are stored on the computer memory, and the software routine compares an image recorded by the image recorder 18 to the manufacturing specification. The captured images and manufacturing tolerance images can be viewed by an operator on a computer display.

Data collected by the images recorders 18 and data generated by analysis software stored in a memory of the computer can be saved and stored on a memory for statistical evaluation and process control. Thus, the system 10 can be configured as a data gathering instrument. In this way, and in combination with other features, this system 10 can be a valuable tool in statistical process control and the like. Out of tolerance data can be stored as well as all deviations, such as geometric variance, for example angles/degrees (see FIGS. 12-14), of pallets 30 and pallets 30 and loads 46 from boundaries 44, 45a,b but still within target areas 42, 43a,b. or outside of target areas 42, 43a,b, as the case may be.

A software can also be implemented to print pallet tags with inspection information, manufacturing data, pallet destination, order information, etc. for quality inquiries related to time and date of manufacturing and the variables related to same, for example tracing where the pallet is to be transported and from where the pallet was transported.

It must be understood that the comparison function or step can be a comparison of digital data corresponding to the captured image and digital data corresponding to the manufacturing tolerance, rather than actual images of the loaded pallet and loaded pallet manufacturing tolerances.

One software routine stored in a memory on the system performs a pass/fail analysis on an image collected by the image recorder 18. This software routine determines whether a loaded pallet 30 falls within a manufacturing tolerance of one or more quality manufacturing specifications or standards. Accordingly, the software routine may compare a captured image to a standard and output whether the captured image falls within the manufacturing tolerance, or the software routine may make a determination based on the recorder image itself. This may be accomplished by comparing the captured image to more than one image stored on the memory to reflect a manufacturing tolerance or range or comparing the captured image to a composite image reflecting the manufacturing tolerance.

For example, the alignment or position of the loaded pallet 30 on the conveyor 22 is one such quality standard. The captured image may be compared to manufacturing specification stored in the memory of the computer 26, or the system 10 may comprise a target area 42 defined by a boundary 44 visibly marked on a surface of the conveyor 22, which may have a greater surface area than a cross-sectional surface area of the pallet 30. Alternatively, the target area 42 may comprise a reference line or lines. In the example illustrated, the target area 42 is horizontally aligned. In the case of a stored standard, the software routine compares the captured image to a stored image. In the case of the target area 42 marked on the conveyor 22, the software routine recognizes whether the pallet 30 lies within the target area 42 by resolving between the target area 42 and the pallet 30. FIG. 5 shows a loaded pallet 30 within the alignment tolerance, and FIGS. 8 and 9 show a loaded pallet 30 outside the alignment tolerance.

Alternatively, the target area 42 can be defined by crosshairs 48 generated by, on, or within the image recorder 18.

Figure 8:
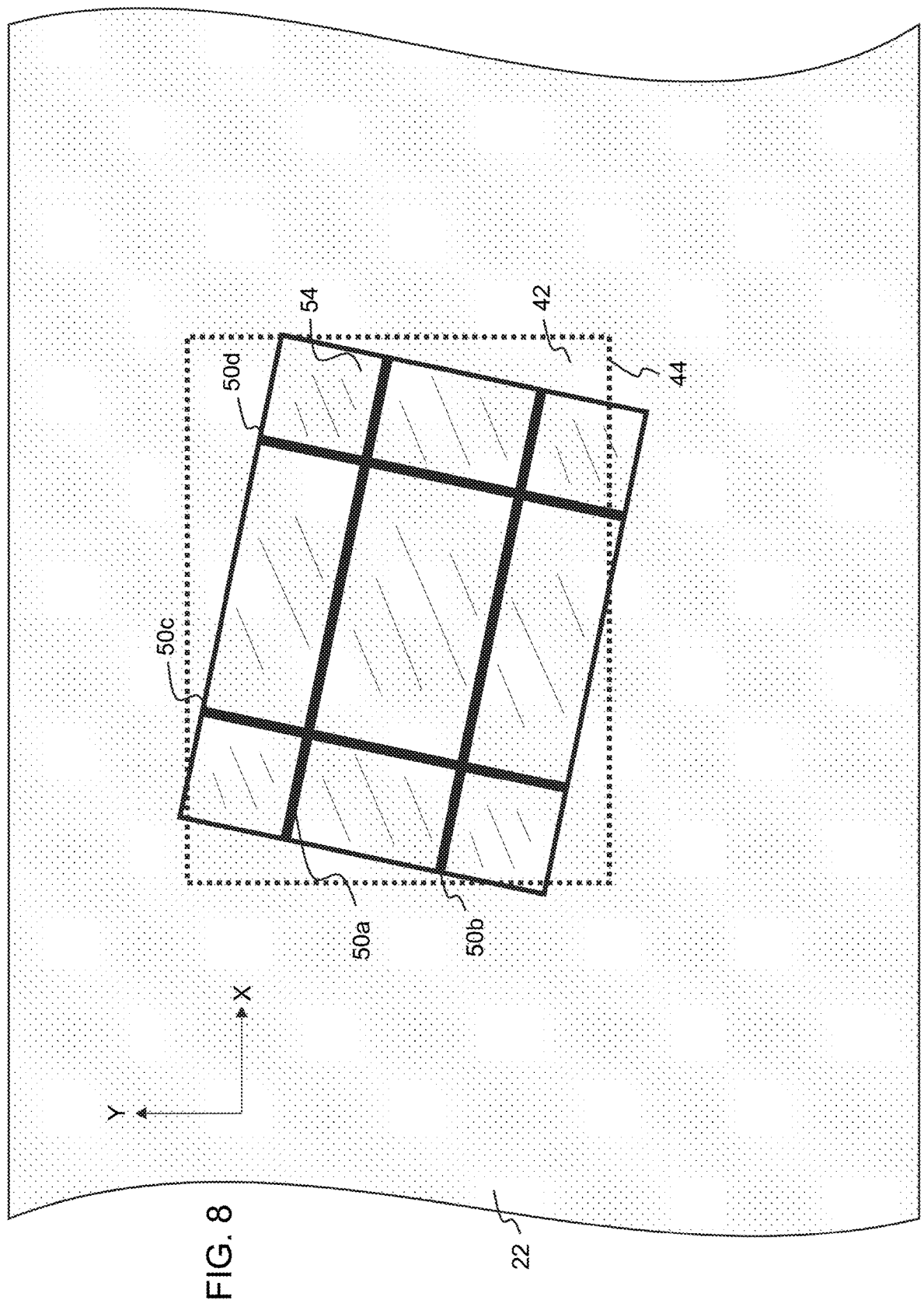
FIG. 8 is a top view of a pallet loaded with metallic container bodies supported on a conveyor and in an out of tolerance condition.
Figure 9:
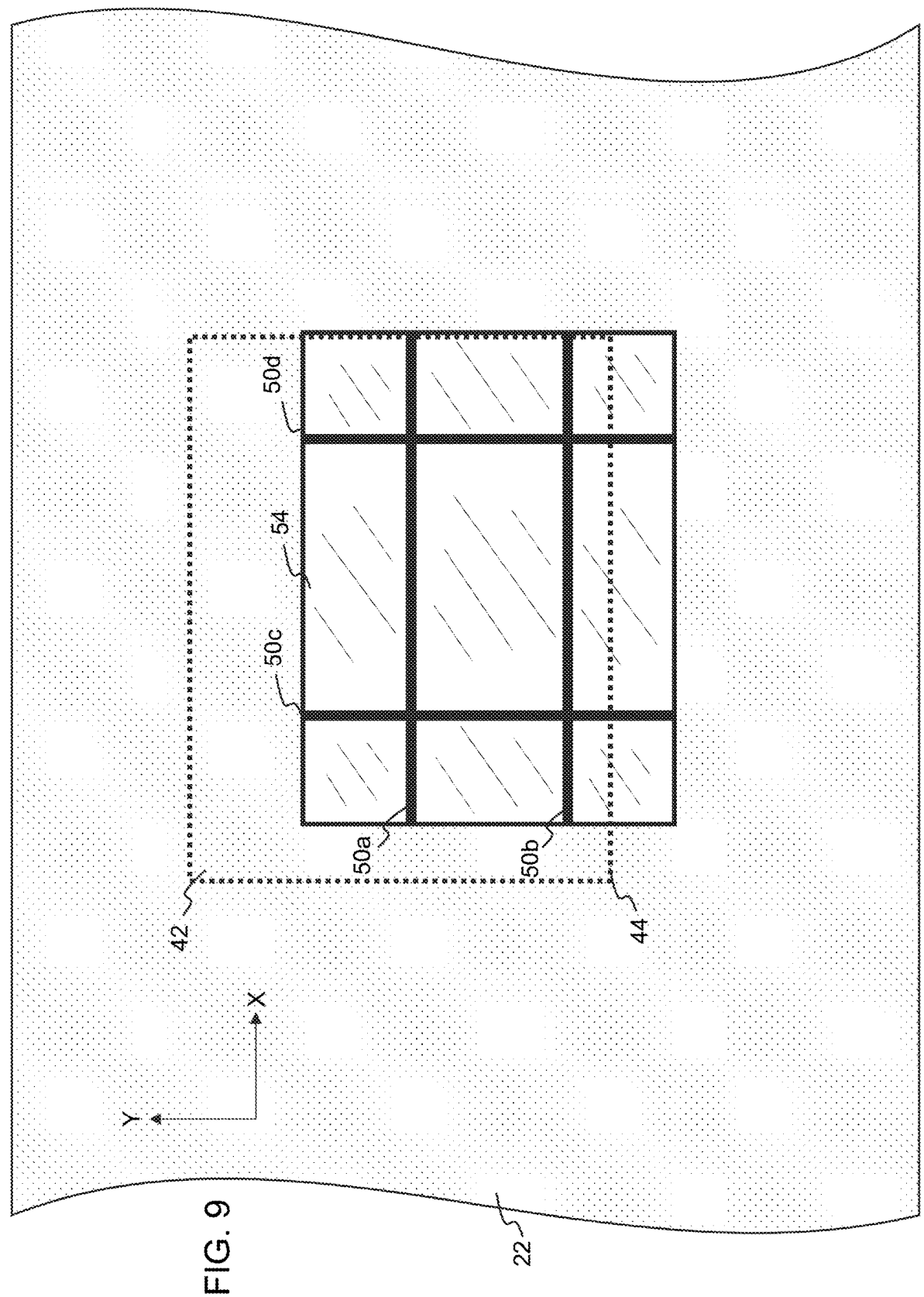
FIG. 9 is a top view of a pallet loaded with metallic container bodies supported on a conveyor and in an out of tolerance condition.
Figure 10:
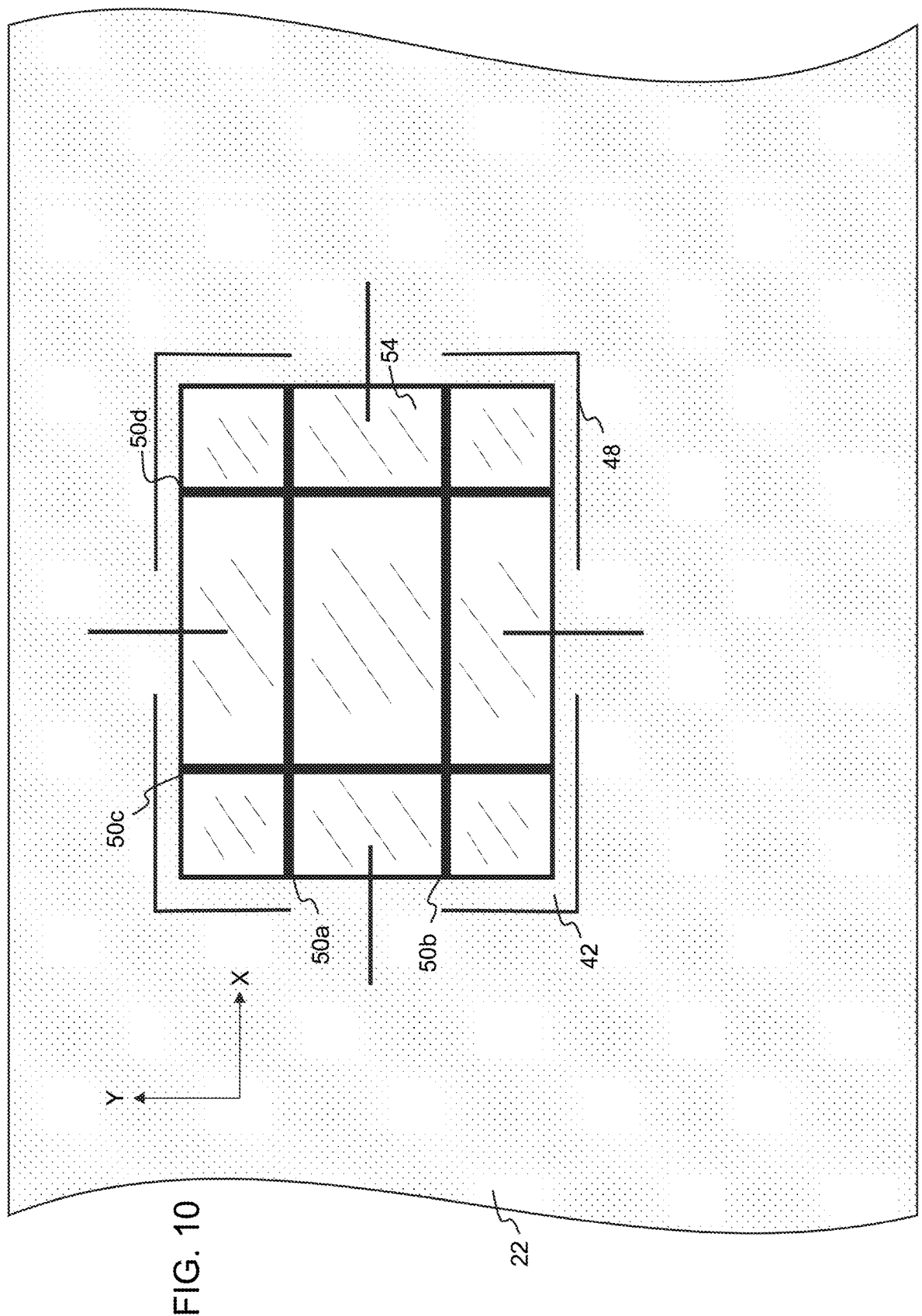
FIG. 10 is a view of a top surface of a loaded pallet through an image recorder having a crosshair pattern defining a target area of a manufacturing specification.
Figure 13:
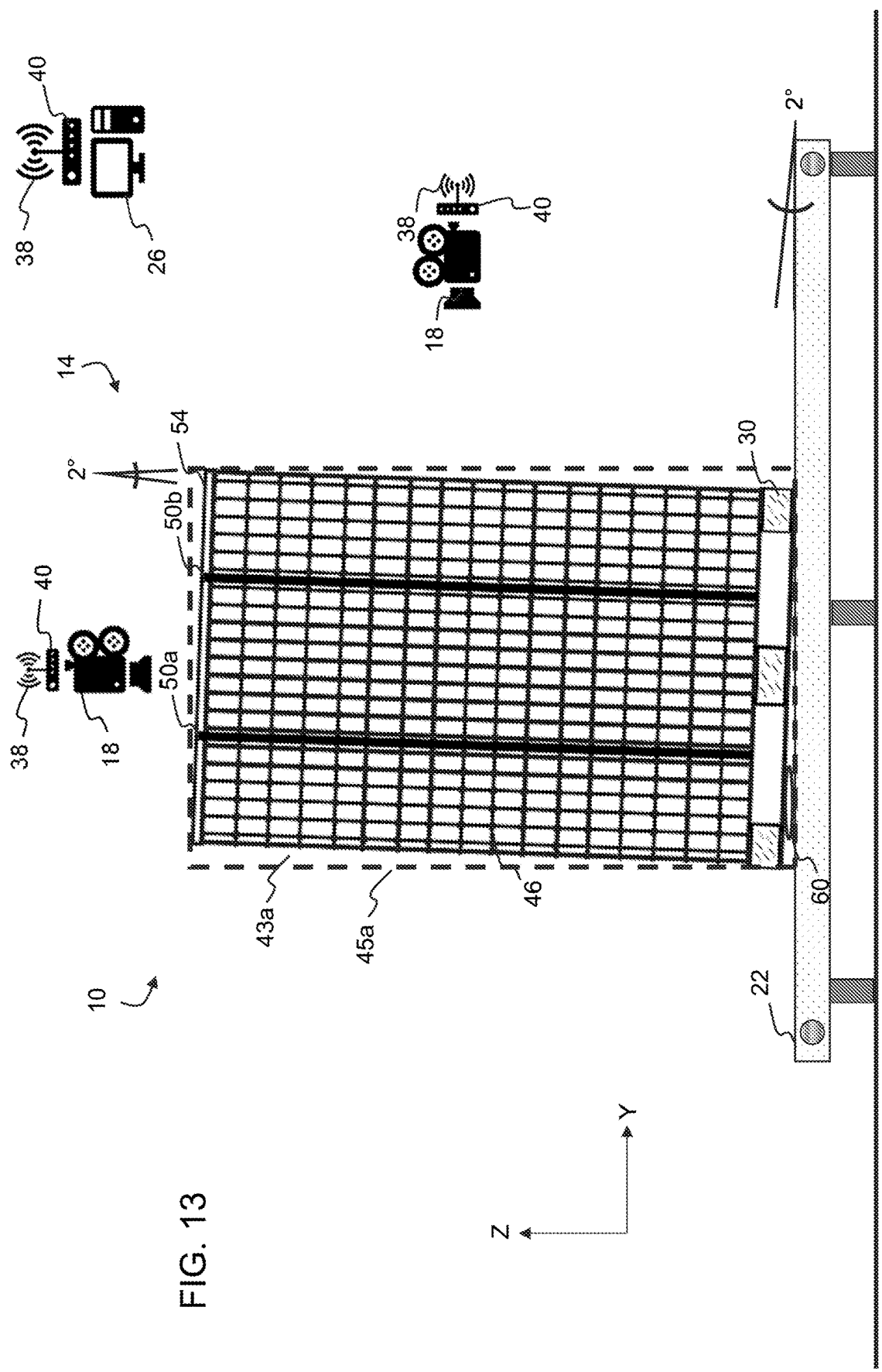
FIG. 13 is a side view of a pallet loaded with metallic container bodies supported on a conveyor and an inspection system according to the present invention.
Figure 14:
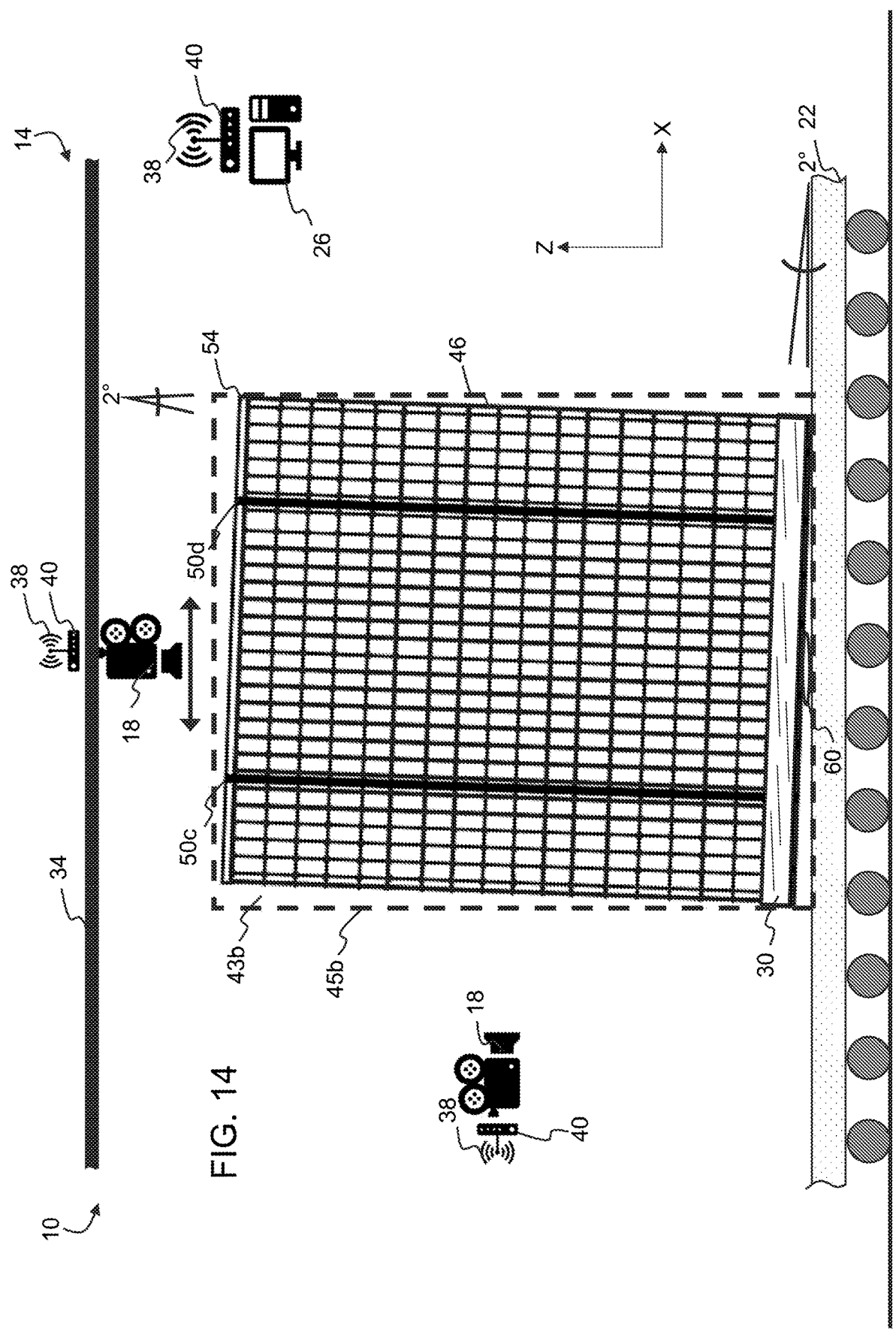
FIG. 14 is a side view of a pallet loaded with metallic container bodies supported on a conveyor and an inspection system according to the present invention of FIG. 13 taken at 90 degrees to FIG. 13.

In another example illustrated in FIGS. 13 and 14, one or more target areas 43*a,b* are vertically aligned rather than horizontally aligned as illustrated in, for example, FIGS. 7-9. These vertically aligned target areas 43*a,b* may be used in combination with a horizontally aligned target area 42 or alone. Similar to the previous embodiments, a captured image or images may be compared to manufacturing specification(s) stored in the memory of the computer 26, or the system 10 may comprise a target areas 43*a,b* defined by boundaries 45*a,b* visibly marked on a vertical wall, which may have a greater surface area than a surface area of a cross-section of the loaded pallet 30 taken vertically through the loaded pallet 30. In the case of a stored standard, the software routine compares the captured image to a stored image. In the case of the target areas 43*a,b* marked on a vertical surface, the software routine recognizes whether the loaded pallet 30 lies within the first and second vertical target areas 43*a*, by resolving the target areas 43*a,b*, from the loaded pallet 30. FIGS. 13 and 14 show loaded pallets 30 relative to first and second vertical target areas 43*a,b*.

Alternatively, the first and second vertical target area 43*a,b* can be defined by crosshairs within the image recorder 18.

Figure 12:
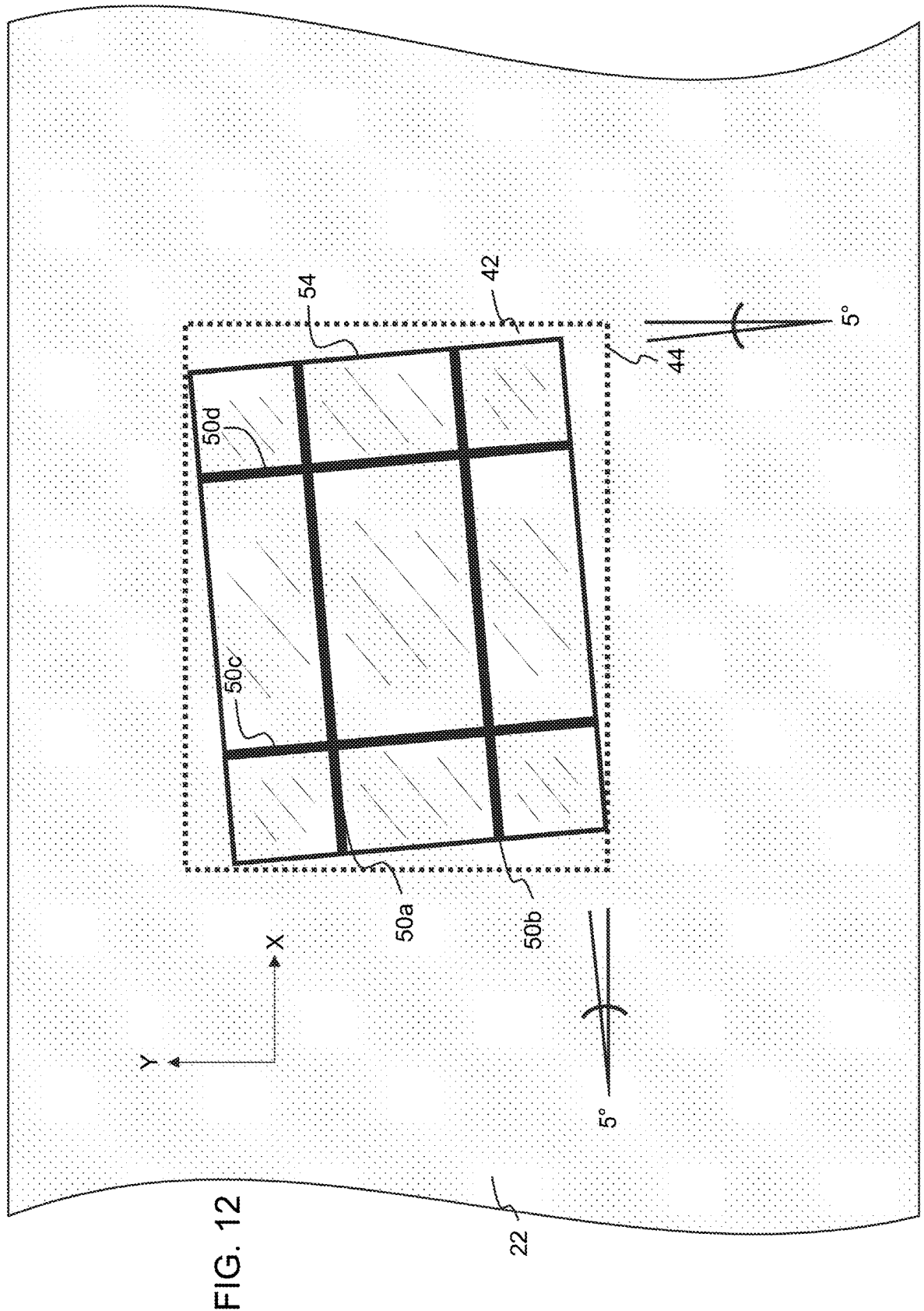
FIG. 12 is a view of a top surface of a loaded pallet with metallic container bodies supported on a conveyor showing angular or geometric measurements taken relative to longitudinal and transverse linear targets.

In one embodiment, the system 10 includes a first vertical target area 43*a* which is configured about an X-axis for analysis of the pallet 30 alignment relative to a Y-axis and a Z-axis as shown in FIG. 13. Here, an image recorder 18, such as shown, for example, in FIGS. 3 and 12, is located to capture images of the pallet 30 along the X-axis. This allows analysis of the pallet 30 relative to the Z-axis and/or the Y-axis. Thus, pallet 30 tilt data relative to a horizontal plane on which a surface of the conveyor 20 on which the pallet 30 can be captured and the first vertical target area 43*a*, stored, and evaluated relative to a manufacturing standard. This embodiment is particularly useful in determining anomalies in connection with the conveyor 20. For example, an undesirable foreign object 60 may be located on the conveyor 22 which causes repeated pallets 30 being outside a manufacturing tolerance relative to tilt along the Z-axis and/or the Y-axis.

In one embodiment, the system 10 includes a second vertical target area 43*b* which is configured about a Y-axis for analysis of the pallet 30 alignment relative to an X-axis and a Z-axis as shown in FIG. 14. Here, an image recorder 18, such as shown, for example, in FIGS. 3 and 12, is located to capture images of the pallet 30 along the X-axis. This allows analysis of the pallet 30 relative to the Z-axis and/or the Y-axis. Thus, pallet 30 tilt data relative to a horizontal plane on which a surface of the conveyor 20 on which the pallet 30 is supported and the second vertical target area 43*b* can be captured, stored, and evaluated relative to a manufacturing standard. This embodiment is also useful in determining anomalies in connection with the conveyor 20. For example, an undesirable foreign object 60 may be located on the conveyor 22 which causes repeated pallets 30 being outside a manufacturing tolerance relative to tilt along the Z-axis and/or the X-axis.

In one embodiment, a system 10 uses first and second vertical target areas 43*a,b*. Using a combination of first and second vertical target areas 43*a,b* allows analysis of the pallet 30 relative to a horizontal plane on which the pallet 30 is supported and the first and second vertical target areas 43*a,b*. Images can be captured, stored, and evaluated relative to a manufacturing standard. Thus, analysis can be carried out relative to the X-axis, the Y-axis, and the Z-axis.

In another embodiment, the first and second vertical target areas 43*a,b* are sized based on the longitudinal and transverse cross-sectional areas of the pallet 30 rather than the size of the loaded pallet 30. This allows for variations in load size without changing the area of the first and second vertical target areas 43*a,b*. This is particularly adapted for use when the target areas 43*a,b* are defined by crosshairs generated, on, or otherwise provided by the image recorder 18 and/or software associated with same.

Another software routine determines whether a load of containers 46 is properly secured to the pallet 30. For example, a loaded pallet might require four straps or bands 50*a-c*. Two bands 50*a.b* extend longitudinally in the direction of conveyor 22 traverse and parallel to each other about the pallet 30 and the containers 46 and over a protective layer 54 place on an uppermost row of the containers 46, stacked in columns and rows on the pallet 30. Another two bands 50*c,d* extend transversely to the direction of conveyor 22 traverse at 90-degree angles to the longitudinal bands 50*a,b*. This arrangement forms a pattern of 9 rectangular shapes formed by the intersecting bands 50*a-c*. The software routing determines whether proper number of bands 50*a-d* are in the proper position of the loaded pallet 30.

In one embodiment, a software routine uses pattern recognition and pattern matching logic to determine an out of tolerance condition. In this example, the manufacturing specification requires a target pattern on the protective layer or top frame 54 of the loaded pallet 30 wherein the longitudinal and transverse straps 50*a-d* intersect forming a nine-rectangle target pattern. A missing strap(s) would create a pattern which would not match the target pattern.

In one embodiment, a software routine uses pattern recognition and pattern matching logic to determine an out of tolerance condition. In this example, the manufacturing specification requires a loaded pallet 30 to fit within a target area 42. A skewed or twisted pallet would create a nonconforming pattern which would extend past a boundary 44 of the target area 42.

In one embodiment, there is a communication link 40 between the inspection station 14 and the computer 26. This communication link 40 may be provided wirelessly or wired. The computer 26 may be electrically connected to the conveyor 22 such that a software routine stored on the computer memory sends a signal to the conveyor 22 to lockout movement of the conveyor 22 in the case of an out of tolerance situation. Accordingly, the signal may be sent via the communication link 40 to the inspection station 14 or other conveyor controller in response to an output of the software routine. This signal may contain information, access information, or activate a software routine that causes an automated change in the operating parameters of the conveyor 22. For example, the conveyor 22 traverse or movement can be automatically stopped in response to an output by the software routine by sending a signal from the computer to the conveyor. This software and computer 26 closes the loop back to the manufacturing process to adjust the loaded pallet 30 on the conveyor. Such adjustment may be performed automatically or may alert personnel to the situation for taking corrective action.

Figure 11:
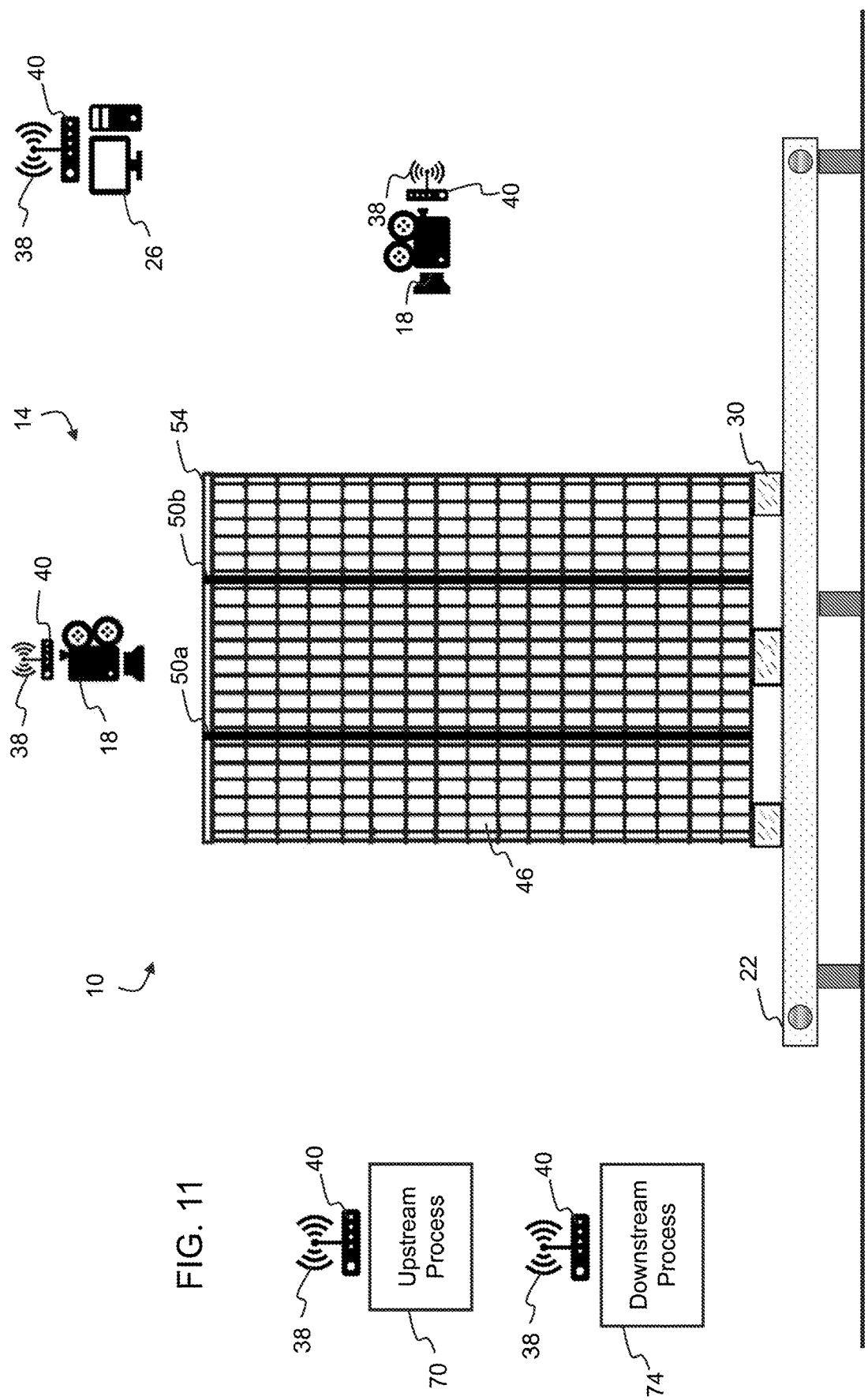
FIG. 11 is a side view of a pallet loaded with metallic container bodies and an inspection system according to the present invention with upstream and downstream process control.

As illustrated in FIG. 11, in one embodiment, there is communication links 40 between the computer 26 and upstream and downstream processes 70,74. These communication links 40 may be provided wirelessly or wired. The computer 26 may be electrically connected to the upstream and downstream processes 70,74 such that a software routine stored on the computer memory sends a signal 38 to the upstream and downstream processes 70,74 to force a corrective action automatically or alert manufacturing personnel of the need to take corrective action in the case of an out of tolerance situation. Accordingly, the signal 38 may be sent via the communication link 40 to the upstream and downstream processes 70,74 in response to an output of the software routine. This signal may contain information, access information, or activate a software routine that causes an automated change in the operating parameters of the upstream and downstream processes 70,74.

For example, the upstream process 70 can be a banding station for securing bands or straps 50a-d to the loaded pallet 30 can be automatically stopped in response to an output by the software routine by sending a signal from the computer to the banding station.

For example, the downstream process 74 can be a pallet adjustment station for correcting pallet position on the conveyor 22 can be automatically alerted in response to an output by the software routine by sending a signal from the computer to the pallet adjustment station.

In one embodiment, as illustrated in FIG. 11, in one embodiment, there is communication links 40 between the computer 26 and upstream and downstream processes 70,74. These communication links 40 may be provided wirelessly or wired. The computer 26 may be electrically connected to the upstream and downstream processes 70,74 such that a software routine stored on the computer memory sends a signal 38 to the upstream and downstream processes 70,74 to force a corrective action automatically or alert manufacturing personnel of the need to take corrective action in the case of an out of tolerance situation. Accordingly, the signal 38 may be sent via the communication link 40 to the upstream and downstream processes 70,74 in response to an output of the software routine. This signal may contain information, access information, or activate a software routine that causes an automated change in the operating parameters of the upstream and downstream processes 70,74.

For example, the upstream process 70 can be a banding station for securing bands or straps 50a-d to the loaded pallet 30 can be automatically stopped in response to an output by the software routine by sending a signal from the computer to the banding station.

Figure 15:
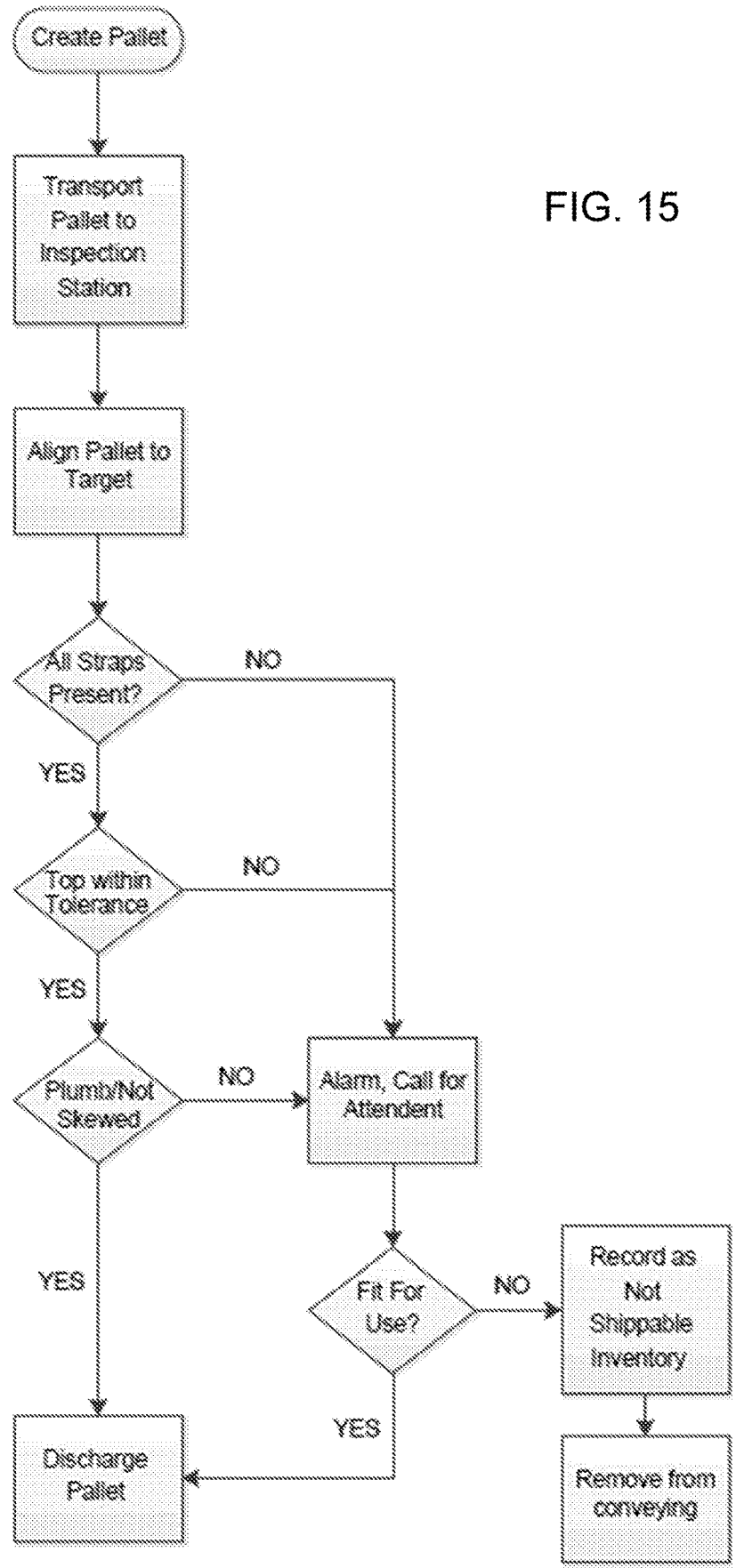
FIG. 15 is a flowchart of a process employed by a system of the present invention.

Referring to FIG. 15 in combination with FIGS. 3-14, a method of invention comprises the steps: 1) creating a loaded pallet; 2) transporting the loaded pallet to the inspection station; 3) aligning the loaded pallet to one or more target areas; 4) examining the loaded pallet; and 5) exiting the loaded pallet from the inspection station.

In a method of the invention, the step of examining the loaded pallet may be performed by a combination of one or more image recorders 18 as described above.

In a method of the invention, the step of examining the loaded pallet may include a software stored on a memory of a computer 26.

In a method of the invention, the step of examining the loaded pallet may include a determination whether the loaded pallet on the conveyor is within a manufacturing tolerance.

In a method of the invention, the manufacturing tolerance is directed to whether a plurality of articles 46 is adequately secured to a pallet 30. The determination may be made via a subroutine in the software making a comparison of one or more images of the loaded pallet against a manufacturing standard image of properly secured articles 46 to a pallet 30. The articles 46 may be secured to the pallet by a retainer, comprising straps, metal bands, and/or plastic wrap.

In a method of the invention, the manufacturing tolerance is directed to whether the loaded pallet is properly aligned relative to an axis transverse to a movement of the conveyor. The determination may be made by a subroutine in the software which determines whether loaded pallet a two-dimensional surface area of the loaded pallet lies with the one or more target areas.

In a method of the invention, the manufacturing tolerance is directed to whether the loaded pallet is properly aligned relative to an axis parallel to a movement of the conveyor. The determination may be made by a subroutine in the software which determines whether loaded pallet a two-dimensional surface area of the loaded pallet lies with the one or more target areas.

In a method of the invention, a step includes generating an alarm or alert for an attendant or manufacturing personnel to the loaded pallet being outside of the manufacturing tolerance. The alert or alarm may be generated by a subroutine in the software and may be audible or visual. The attendant may manually determine whether the loaded pallet is fit for use and record whether the loaded pallet is ready for transfer to the next manufacturing process, for example shipping, or whether the loaded pallet must be removed from the conveyor.

In a method the invention, a step includes discharging the loaded pallet to a further manufacturing process automatically after the determination of whether the loaded pallet is within a manufacturing tolerance. The step may be performed by a subroutine in the software.

In a method of the invention, a step includes printing a pallet tag after the determination of whether the loaded pallet is within a manufacturing tolerance.

Figure 16:
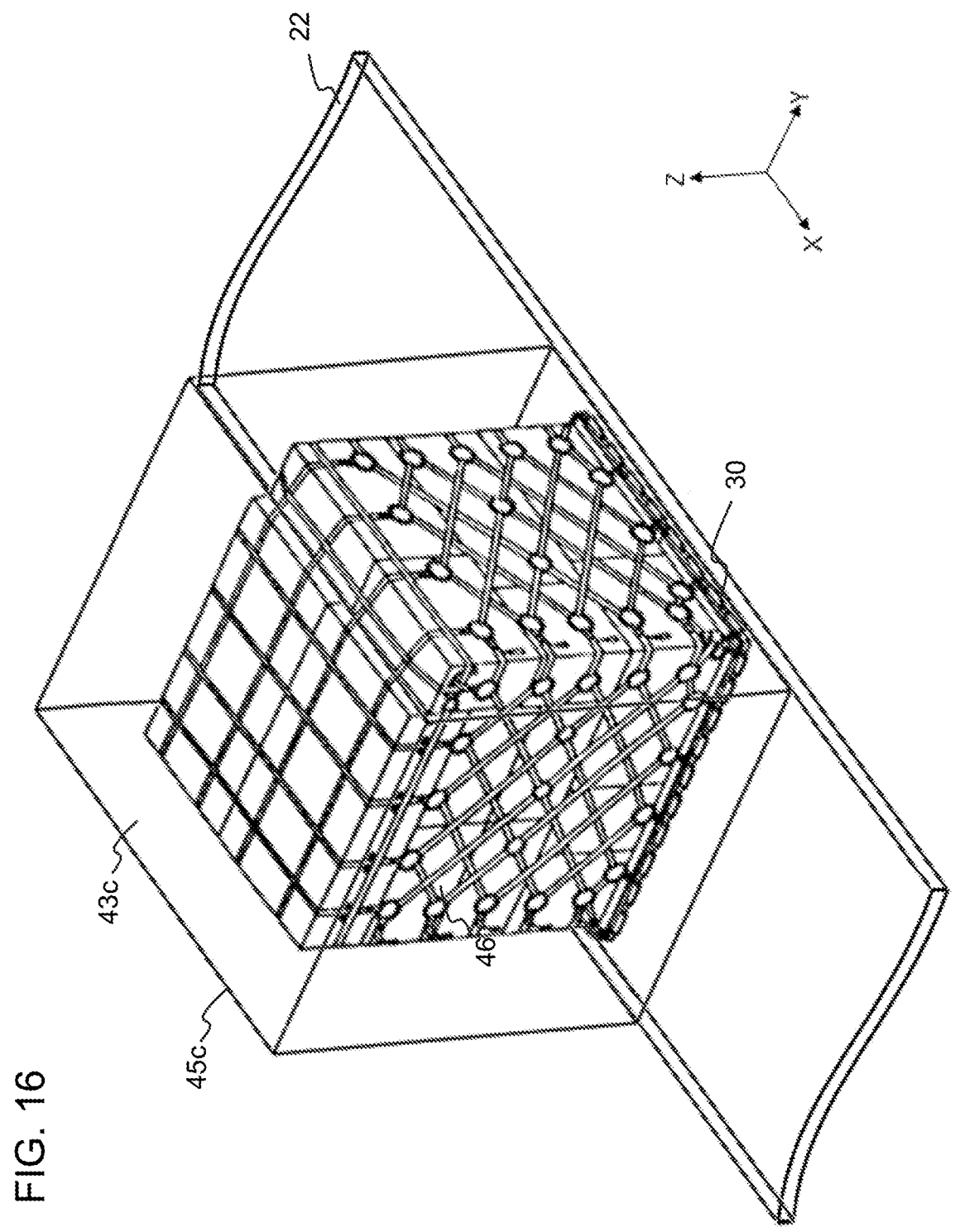
FIG. 16 is a perspective view of a pallet loaded with manufactured articles on a conveyor showing a three-dimensional target area.

Referring to FIG. 16, it is further contemplated that a target area 43c may be three-dimensional. Here, the target area 43c is defined by a virtual volume and is formed a boundary 45c. Analysis of a loaded pallet is performed by determining whether the loaded pallet lies within the virtual volume of the target area 43c.

The system 10 described herein removes the need for human inspection. This will result in lower labor costs and provide a more consistent inspection.

While the specific embodiments have been illustrated and described, numerous modifications come to mind without significantly departing from the spirit of the invention, and the scope of protection is only limited by the scope of the accompanying claims.

What is claimed is:

1. A loaded pallet inspection system comprising:
a generally horizontal support surface;
an image recorder supported near the support surface;
a computer having a memory with a software routine stored thereon, for determining whether an image of a loaded pallet is within a manufacturing tolerance of a manufacturing specification;
a communication link transmitting signals between the image recorder and the computer,
a target area defined by a boundary having a surface area greater than a cross-sectional surface area of the loaded pallet, wherein the manufacturing specification comprises a position of the loaded pallet on the generally horizontal support surface and the target area corresponds to the manufacturing tolerance;
a first guide mounted above the support surface, wherein the first guide supports the image recorder and is configured to allow longitudinal movement by the image recorder in a direction of a traverse of a conveyor; and
a second guide mounted above the support surface, wherein the second guide further supports the image recorder and is configured to allow transverse movement by the image recorder in a direction transverse to the direction of the traverse of the conveyor,
wherein the image recorder is multi-positional relative to the support surface.

2. The loaded pallet inspection system of claim 1 wherein the target area is visibly marked on the support surface.

3. The loaded pallet inspection system of claim 1 wherein the target area is defined by crosshairs on the image recorder.

4. The loaded pallet inspection system of claim 1 wherein the support surface is a conveyor for moving loaded pallets.

5. The loaded pallet inspection system of claim 1 wherein the manufacturing specification is further directed to an arrangement of straps securing a plurality of articles to the loaded pallet.

6. The loaded pallet inspection system of claim 5 wherein the software routine uses a pattern recognition subroutine or a pattern matching logic subroutine to determine whether loaded pallet is within a tolerance of the manufacturing specification.

7. The loaded pallet inspection system of claim 6 the computer is in electrical communication with the conveyor to control a movement of the conveyor in response to an output from the software routine.

8. The loaded pallet inspection system of claim 1 wherein the target area is transverse to the support surface.

9. The loaded pallet inspection system of claim 1 wherein the target area is three dimensional forming a virtual volume.

10. A method of inspecting a loaded pallet inspection using the loaded pallet inspection system of claim 1, the method comprising the steps of: providing an image recorder supported adjacent a conveyor; capturing an image of the loaded pallet supported on the conveyor; transmitting a signal from the image recorder to a computer wherein the signal carries digital information for reproducing the image on the computer; comparing the image to a manufacturing specification using a software routine stored on a memory on the computer; determining whether the image is within a manufacturing tolerance of the manufacturing specification using the software routine.

11. The method of claim 10 further comprising the step of: moving the image recorder relative to the conveyor in a direction of a traverse of the conveyor.

12. The method of claim 11 further comprising the step of: moving the image recorder relative to the conveyor in a direction transverse to the traverse of the conveyor.

13. The method of claim 12 further comprising the step of: automatically stopping movement of the conveyor in response to an output by the software routine by sending a signal from the computer to the conveyor.

14. The method of claim 12 wherein the image recorder is supported above the conveyor at height greater than a height of a loaded pallet wherein the capturing an image step includes capturing an image of a top surface of the loaded pallet supported on the conveyor.

* * * * *